US012669059B2

(12) United States Patent
Lemonnier et al.

(10) Patent No.: US 12,669,059 B2
(45) Date of Patent: Jun. 30, 2026

(54) AIR INJECTION CASING FOR A TURBOMACHINE

(71) Applicant: SAFRAN AIRCRAFT ENGINES, Paris (FR)

(72) Inventors: Jérôme Claude George Lemonnier, Moissy-Cramayel (FR); Franck Davy Boisnault, Moissy-Cramayel (FR); Fabrice Marcel Noël Garin, Moissy-Cramayel (FR); Damien Bonneau, Moissy-Cramayel (FR); Delphine Touchard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/167,751

(22) PCT Filed: Mar. 20, 2024

(86) PCT No.: PCT/FR2024/050329
§ 371 (c)(1),
(2) Date: Sep. 22, 2025

(87) PCT Pub. No.: WO2024/194566
PCT Pub. Date: Sep. 26, 2024

(65) Prior Publication Data

US 2026/0110251 A1 Apr. 23, 2026

(30) Foreign Application Priority Data

Mar. 23, 2023 (FR) ...................................... 2302735

(51) Int. Cl.
*F01D 5/08* (2006.01)

(52) U.S. Cl.
CPC .......... *F01D 5/082* (2013.01); *F05D 2240/55* (2013.01)

(58) Field of Classification Search
CPC ............................ F01D 5/082; F05D 2240/55
See application file for complete search history.

(56) References Cited

U.S. PATENT DOCUMENTS 3,986,720 A * 10/1976 Knudsen ................ F01D 11/18 277/411
3,989,410 A 11/1976 Ferrari
(Continued)

FOREIGN PATENT DOCUMENTS

WO 2020131030 A1 6/2020

OTHER PUBLICATIONS

International Search Report with English translation issued in International Application No. PCT/FR2024/050329, mailed Sep. 26, 2024 (5 pages).
(Continued)

*Primary Examiner* — Michael K. Reitz
(74) *Attorney, Agent, or Firm* — Bookoff McAndrews, PLLC

(57) ABSTRACT

The invention relates to a cooling-air injection casing comprising a casing upstream end, a casing downstream end, and a casing main wall and further including: an air mixing cavity; an air intake cavity; an air bleeding cavity; a first sealing gasket; a second sealing gasket; the injection casing having further an air passage cavity bounded by a substantially radial wall, the casing main wall and the substantially axial wall, the air passage cavity being in fluid communication with the air mixing cavity via apertures made in the substantially axial wall, and in that the air passage cavity is in fluid communication with the air bleeding cavity by means of apertures made in the substantially radial wall.

9 Claims, 3 Drawing Sheets

(56) References Cited

U.S. PATENT DOCUMENTS

| | | | | |
|---|---|---|---|---|
| 5,402,636 | A | 4/1995 | Mize et al. | |
| 5,816,776 | A * | 10/1998 | Chambon | F01D 11/001 415/174.4 |
| 6,095,750 | A | 8/2000 | Ross et al. | |
| 7,331,763 | B2 * | 2/2008 | Higgins | F01D 5/08 415/176 |
| 2004/0247429 | A1 * | 12/2004 | Arilla | F01D 11/001 415/116 |
| 2021/0199051 | A1 * | 7/2021 | Gonyou | F01D 17/143 |

OTHER PUBLICATIONS

Preliminary Search Report issued in French Application No. 2302735, mailed on Oct. 11, 2023 (2 pages).

* cited by examiner

[Fig. 1]
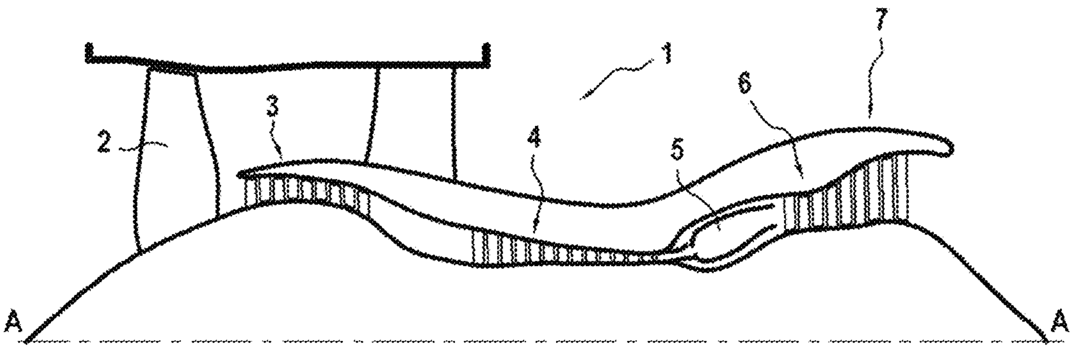
[Fig. 2]
PRIOR ART
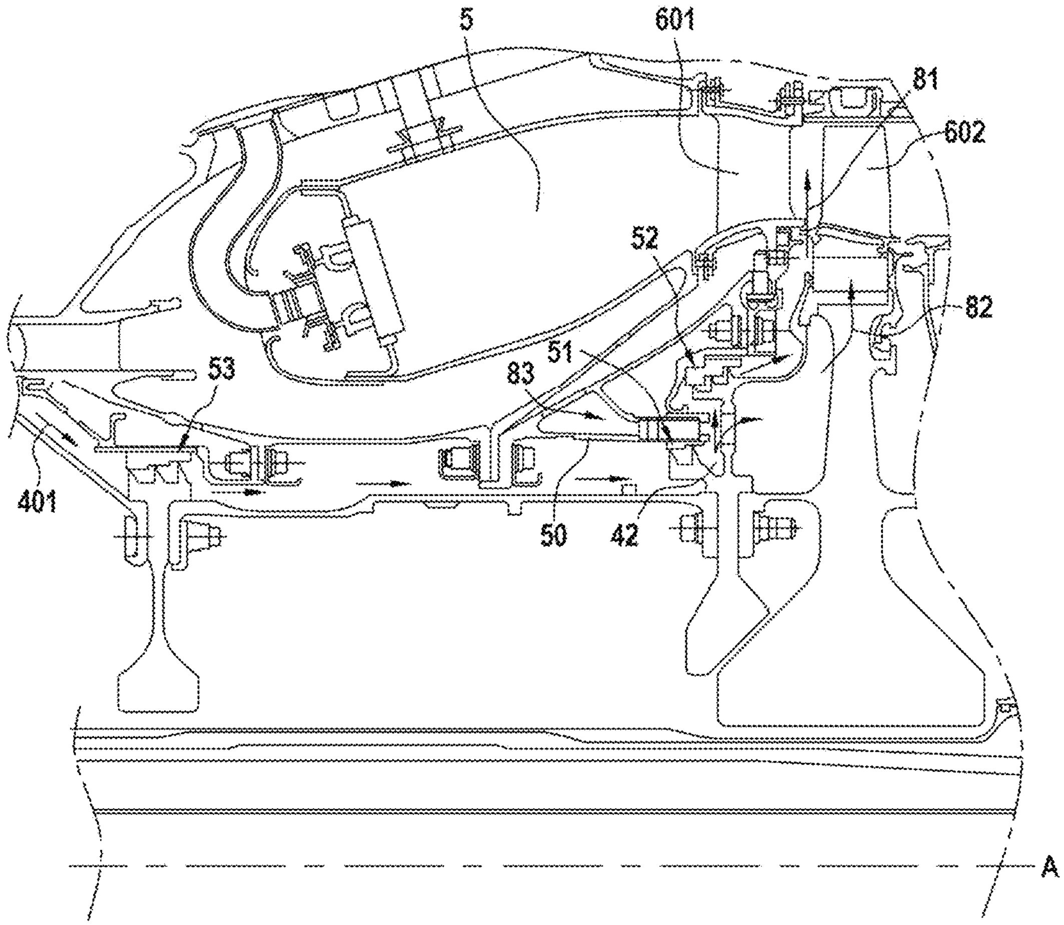

[Fig. 3]
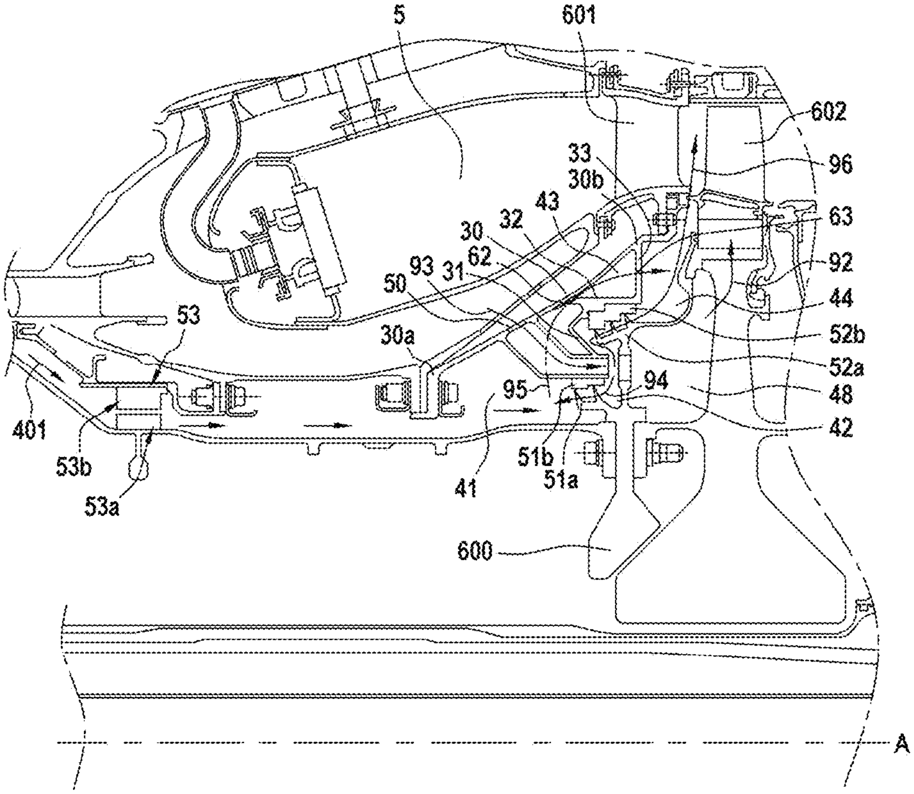
[Fig. 4]
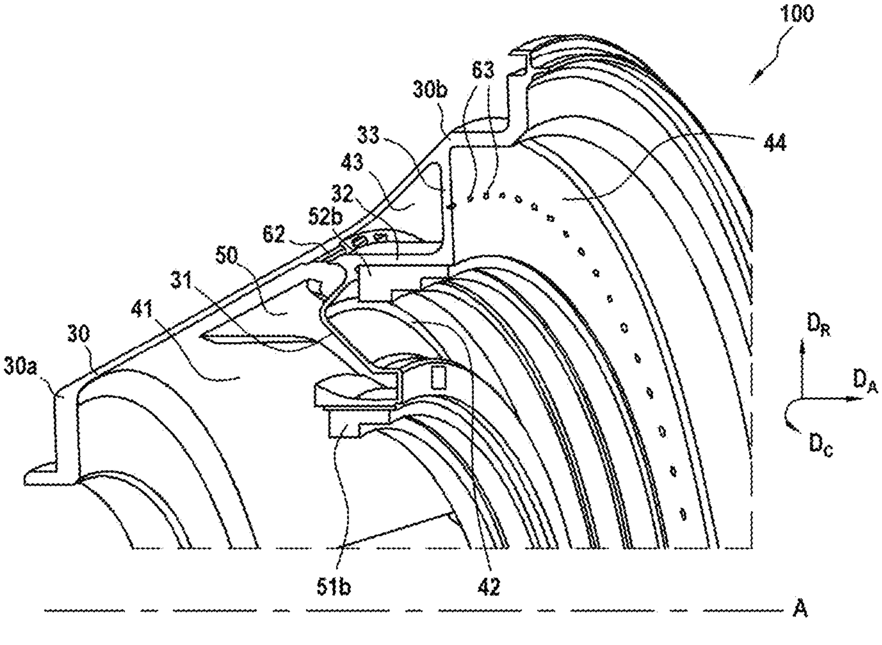

[Fig. 5]
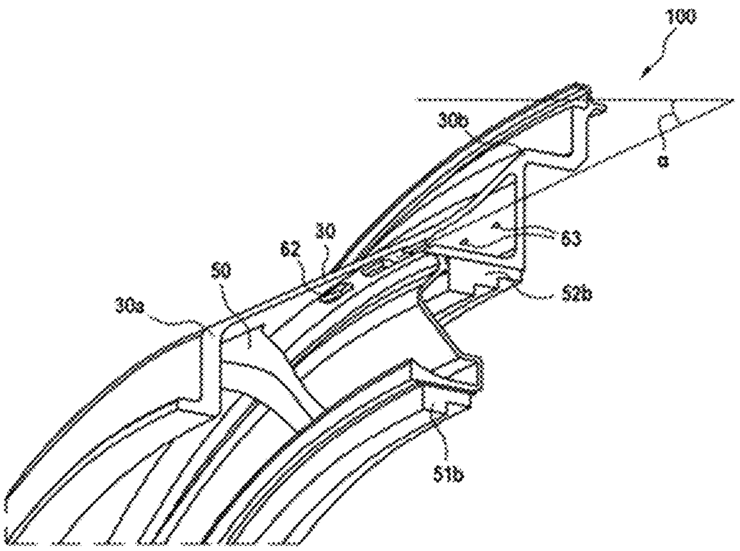
[Fig.6]
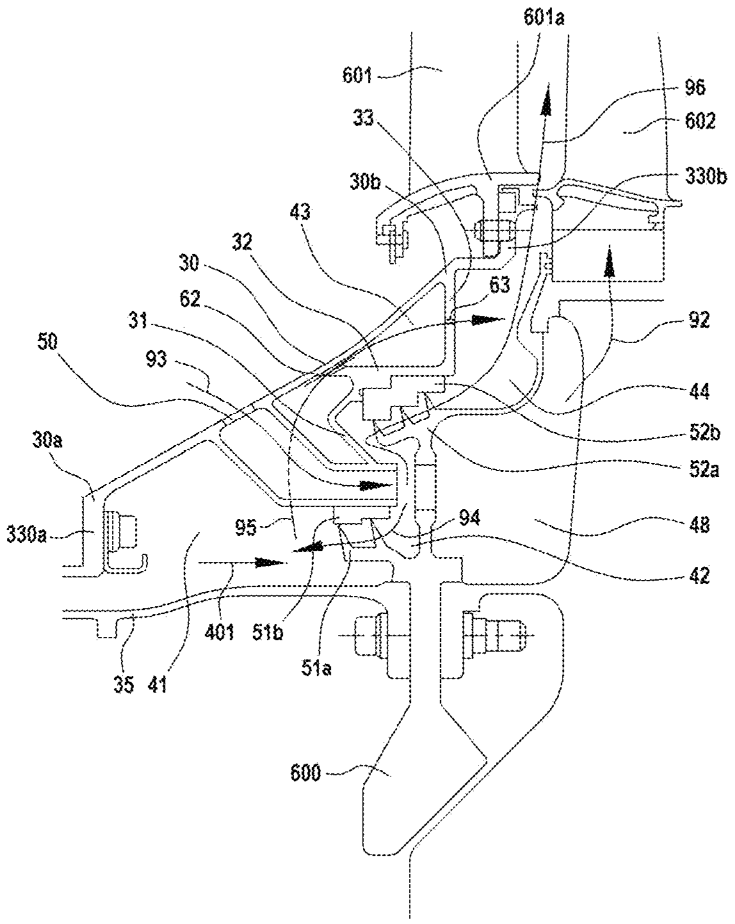

AIR INJECTION CASING FOR A TURBOMACHINE

CROSS-REFERENCE TO RELATED APPLICATIONS

This is a National Stage Application under 35 U.S.C. § 371 of International Application No. PCT/FR2024/050329, filed Mar. 20, 2024, which claims priority to French Patent Application No. 2302735, filed on Mar. 23, 2023, the entireties of which are incorporated herein by reference.

TECHNICAL FIELD

The present disclosure relates to turbomachines, and more precisely to air intake casings for cooling hot parts.

PRIOR ART

The design of ventilation circuits of an aeronautical turbomachine is delicate and represents a potential performance loss.

In fact, the turbomachine is all the more efficient when it operates at high temperature. However, the materials that constitute it then require greater cooling. Cooling is generally accomplished by extracting a portion of the air from the cold air stream, which harms overall performance.

Generally, it is known to extract air for cooling radially below the combustion chamber and downstream of the last stage of the compressor disk.

The air extracted from these two sources is then mixed, and then routed to the blades needing cooling.

However, such ventilation circuits have certain limitations which reduce their effectiveness and reduce the overall performance of the turbomachine.

In fact, if the air extracted radially below the combustion chamber allows the cooling cycle, it has been observed, on the other hand, that the air extracted downstream of the last stage of the compressor disk has a low tangential speed. Yet the cooling of the rotor blades is all the better when the tangential speed of the cooling air is high.

Thus the mixing of the air originating in these two sources diminishes the effectiveness of cooling overall.

However, it is not desirable to forego the air extracted downstream of the last stage of the compressor disk because it needs a minimum air extraction in order to reduce the risk of the pumping phenomenon appearing.

Thus it remains a need for the cooling architectures which ensure that the air used for cooling has a greater tangential speed that that which it is possible to obtain by current circuits.

DISCLOSURE OF THE INVENTION

The present invention seeks precisely to satisfy this need and to propose for this purpose a cooling-air injection casing having an annular shape around a longitudinal axis defining an axial direction and comprising a casing upstream end, a casing downstream end, and a casing main wall which connects the casing upstream end to the casing downstream end, the casing main wall having an annular shape with a diameter that increases from upstream to downstream, the casing further comprising:

- an air mixing cavity, bounded axially by the main wall of the casing from its upstream end and radially by an injector wall integral with the casing main wall and which extends toward the longitudinal axis, the injector wall being connected to a substantially axial wall which radially bounds the air mixing cavity;
- an air intake cavity, bounded upstream by the injector wall and downstream by a high-pressure rotor disk, the air intake cavity being in fluid communication with the air upstream of the casing main wall via an air injector which has at least one injector air inlet made in the casing main wall and an air injector outlet made in the injector wall;
- an air bleeding cavity bounded by a high-pressure rotor disk and a substantially radial wall connected to the casing main wall, the substantially radial wall being further connected to the substantially axial wall;
- a first sealing gasket separating the air mixing cavity and the air intake cavity;
- a second sealing gasket separating the air intake cavity and the air bleeding cavity; the injection casing further having an air passage cavity bounded by the substantially radial wall, the casing main wall and the substantially axial wall, the air passage cavity being in fluid communication with the air mixing cavity via apertures made in the substantially axial wall, and in that the air passage cavity is in fluid communication with the air bleeding cavity by means of apertures made in the substantially radial wall.

The casing described allows obtaining improved cooling in comparison with the casings described in the prior art.

In fact, the provision of fluid communication between the air mixing cavity and the air bleeding cavity via the air passage cavity and due to the apertures made in the radial and axial walls advantageously allows routing cooling air having a low tangential speed out of the cooling circuit.

In fact, during operation, the air bleeding cavity is under reduced pressure due to its proximity with the trailing edge of the high-pressure guide nozzle.

Due to the fluid communication existing between the air bleeding, air passage and air mixing cavities, these three cavities will be under reduced pressure.

On the other hand, the presence of the first sealing gasket, also called the upstream sealing gasket, and of the second sealing gasket, also called the downstream sealing gasket, will allow ensuring that the air intake cavity retains a higher pressure than that of the air bleeding, air passage and air mixing cavities.

As a result, the air extracted downstream of the last stage of the compressor disk and which reaches the air mixing chamber does not cross the first sealing gasket but rather passes directly toward the air bleeding cavity by means of the air passage cavity.

On the other hand, the air extracted by the air intake orifice which arrives at the air intake cavity and which has a high tangential speed can serve for cooling, without being mixed with the air extracted downstream of the last stage of the compressor disk.

It is understood that the sealing implemented is not strict sealing in the sense that the air could not pass the sealing gasket, but rather relative sealing, the purpose of the gasket being to allow a defined quantity of air to pass.

In other words, the upstream and/or downstream sealing gaskets allow maintaining a certain pressure difference between the air intake cavity and, respectively, the air mixing cavity or the air bleeding cavity, but without completely prohibiting air passage.

For example, due to the reduced pressure of the air bleeding cavity and incidentally of the air mixing cavity, the air taken into the air intake cavity can cross the upstream and/or downstream sealing gaskets and thus reach the air mixing and/or air bleeding cavities.

In the present application, the relative positioning terms, for example “upstream,” “downstream,” “internal” and “external” will be interpreted in relation to the horizontal axis A of the casing, defining the axial direction, traversed in the direction of the main and secondary air flows of the turbomachine.

Thus an element designated “upstream” will be traversed before an element designated “downstream,” and an element designated “internal” will be closer to the axis A than an “external” element.

In one embodiment, the axis A can be the main axis of a turbomachine.

One element will be called “integral” with another even when it is not connected to it, provided that the two elements belong to a single part, i.e. there is no means of attachment between the two.

If appropriate, it is indicated when the two elements are “connected” to one another, and it must then be understood that they have a common portion.

In the present application, it will be said that an element extends “substantially” in one direction if the ends of the element form with said direction an angle less than 45°, or less than 20°, or better less than 10°.

Such a definition ensures that wall extending “substantially in the axial direction” prevents air movement in the radial direction, without limiting the intrinsic shape of the wall, which can then be straight or not.

The cooling-air injection casing according to the invention allows ensuring that the air intake cavity accommodates only air having a high tangential speed, which is extracted by the air intake orifice below the combustion chamber.

Thus, the latter can be used for effective cooling of the hot portion of the turbomachine.

Further, this embodiment allows dispensing with the shroud usually preventing fluid communication between the air mixing cavity and the air passage cavity, which is not usually accessible either from the air mixing cavity or from the air bleeding cavity.

In one embodiment, the apertures passing through the substantially axial wall have an inclination to the axial direction comprised between 45° and 70°.

This inclination is understood to be in the direction moving away from the main axis A.

Such an inclination allows easily machining the apertures passing through the substantially axial wall without necessitating specific tools or particular methods, this for all the particular shapes of the main wall.

In one embodiment, the apertures passing through the substantially axial wall are located in the half of the substantially axial wall closest to the main wall, or at the junction of the substantially axial will with the main wall.

This embodiment ensures simplified passage of the air via the air passage cavity toward the air bleeding cavity.

In one embodiment, the apertures passing through the substantially radial wall have an inclination to the axial direction comprised between 45° and 85°, preferably between 70° and 83°.

This inclination is understood to be an angle allowing the air to move away from the main axis.

Such an inclination of the apertures passing through the substantially radial wall allows the air to generate a minimum tangential speed component in order to attenuate viscous heating within the air bleeding cavity.

Preferably, it is the apertures passing through the substantially radial wall which limit the flow rate of air passing through the air passage cavity. In one embodiment, the opening of the apertures passing through the substantially axial wall is greater than the opening of the apertures passing through the substantially radial wall, the opening being defined here as the total surface area of a wall which is eliminated by the apertures.

In one embodiment, the apertures passing through the substantially radial wall have a diameter comprised between 1 mm and 5 mm.

In one embodiment, the apertures passing through the substantially radial wall are placed in a radially external portion of the substantially radial wall.

In other words, the apertures passing through the substantially radial wall are place in the most external half of the substantially radial wall.

The most external half of the substantially radial wall is understood to be the portion of the substantially radial wall which represents the half of the length of the wall most distant from the longitudinal axis. By construction, this is the half-length of the substantially radial wall closest to the main wall.

This embodiment allows further improving the path of the air flow passing through the air passage cavity from the air mixing cavity to the air bleeding cavity.

Further, this allows integrating the presence of apertures without having to displace the sealing gasket possibly supported by the substantially radial wall.

In one embodiment, the first sealing gasket is formed by a first portion arranged on a surface of the high-pressure rotor disk, and a second portion arranged on a support integral with the injector wall.

For example, the first sealing gasket is a sealing gasket which comprises a sealing element mounted on the radially internal end of the injector wall.

In one embodiment, the gasket is a labyrinth seal and the sealing element is an abradable sealing element.

This embodiment allows minimizing the quantity of material necessary for the air intake casing by placing an abradable sealing element on a wall that is otherwise useful to the casing.

In another embodiment, the [sealing gasket is a] self-adjusting sealing gasket, and the sealing element is a movable portion of such a gasket.

In one embodiment, the second sealing gasket being formed by a first portion arranged on a surface of the high-pressure rotor disk and a second portion arranged on the substantially axial wall.

For example, the second sealing gasket is a gasket which comprises a sealing element mounted on the substantially axial wall on the side of the air intake cavity.

This embodiment allows minimizing the quantity of material necessary for the air intake casing by placing the cartridge of abradable material on a wall that is otherwise useful to the casing.

In one embodiment, the injection wall can be substantially radial. In fact, it provides the separation between the air mixing cavity and the air intake cavity.

In one embodiment, the injector wall can be substantially radial while having a portion which also has a component in the radial direction.

For example, the injector wall can extend from upstream to downstream, then from downstream to upstream when it is traversed from its internal end to it external end.

Alternatively, it can extend from downstream to upstream, then from upstream to downstream when it is traversed from its internal end to it external end.

Alternatively, it extends only from downstream to upstream or from upstream to downstream when it is traversed from its internal end to its external end.

The particular geometry of the injector wall allows satisfying other requirements of the wall, such as for example good mechanical support of the air injection orifice.

In one embodiment, the air bleeding cavity can be arranged radially above the air intake cavity.

According to another of its aspects, the invention also relates to an aeronautical turbomachine comprising a rotor and a cooling-air injection casing as was just described which extends around the rotor, the rotor comprising a high-pressure rotors disk which bounds the air intake cavity and the air bleeding cavity, the cooling-air injection casing being arranged upstream of the high-pressure turbine rotor disk.

In one embodiment, the downstream casing end can comprise an attachment flange attached to a part bearing a high-pressure guide nozzle, for example a guide nozzle root.

In one embodiment, the downstream casing end can comprise an attachment flange attached to a part integral with the combustion chamber, for example integral with a wall of the combustion chamber.

In one embodiment, the high-pressure turbine is a single-stage and two-stage high-pressure turbine.

It is in fact in such turbines, and in particular single-stage high-pressure turbines, that the de-pressurization of the bleeding cavity allows a good detour of air having too low a tangential speed component, due to an injection casing described above.

BRIEF DESCRIPTION OF THE DRAWINGS

FIG. 1 shows a turbomachine schematically.

FIG. 2 shows the cooling path of a turbomachine according to the prior art.

FIG. 3 shows a turbomachine provided with an air injection casing according to the invention.

FIG. 4 shows in a first viewing angle a cooling-air injection casing according to the invention.

FIG. 5 shows in a second viewing angle a cooling-air injection casing according to the invention, identical to that of FIG. 4.

FIG. 6 shows details of an air injection casing in an embodiment identical to that of FIG. 3.

DESCRIPTION OF THE EMBODIMENTS

The invention is now described by means of figures, presented for the purpose of description to illustrate certain embodiments of the invention, and which must not be interpreted as limiting the latter. In particular, the figures are not shown to scale, not even to relative scale.

FIG. 1 shows, in section along a vertical plane passing through its main axis A, a double-flow turbojet 1. It includes, from upstream to downstream along the circulation of the air flow, a fan 2, a low-pressure compressor 3, a high-pressure compressor 4, a combustion chamber 5, a high-pressure turbine 6 and a low-pressure turbine 7.

FIG. 2 shows a cooling circuit according to an architecture of the prior art.

In such a cooling circuit, the air path is shown by arrows.

As shown, the cooling air can originate in part from an extraction 401 carried out downstream of the last disk of the high-pressure compressor and also via an air intake orifice present under the combustion chamber 5 extracting the air 83.

However, as disclosed above, the mixing of these two air flows 401 and 83 in an air intake cavity 42, to form the cooling flow 82, does not offer full satisfaction, because the cooling air then has a rather low tangential speed, which reduces its cooling properties.

FIG. 2 again shows the bleeding path of the air 81 located between the high-pressure guide nozzle 601 and the first movable blade 602 of the high-pressure turbine 6, as well as the upstream 51 and downstream 52 sealing gaskets bounding the air intake cavity 42.

FIG. 3 shows a cooling circuit in which the cooling-air injection casing is as described.

In particular, it includes:

- an air mixing cavity 41, bounded axially by the main wall of the casing 30 from its upstream end 30*a* and by an injector wall 31 integral with the main casing wall which extends toward the longitudinal axis A, the injector wall 31 being connected to a substantially axial wall 32 which radially bounds the air mixing cavity 41;
- an air intake cavity 42, bounded upstream by the injector wall 31 and downstream by a high-pressure rotor disk 600, the air intake cavity 42 being in fluid communication with the air upstream of the casing main wall 30 via an air injector which has at least one injector air inlet 50 made in the injector wall 31;
- an air bleeding cavity 44 bounded by a high-pressure rotor disk 600 and a substantially radial wall 33 connected to the casing main wall 30, the substantially radial wall 33 being further connected to the substantially axial wall 32;
- a first sealing gasket 51 separating the air mixing cavity 41 and the air intake cavity 42, the first sealing gasket being formed by a first portion 51*a* arranged on a surface of the high-pressure rotor disk 600, and a second portion 51*b* arranged on a support integral with the injector wall;
- a second sealing gasket 52 separating the air intake cavity and the air bleeding cavity, the second sealing gasket being formed by a first portion 52*a* arranged on a surface of the high-pressure rotor disk 600 and a second portion 52*b* arranged on the substantially axial wall;
- the injection casing further having an air passage cavity 43 bounded by the substantially radial wall 33, the casing main wall 30 and the substantially axial wall 32, the air passage cavity 43 being in fluid communication with the air mixing cavity 41 via apertures 62 made in the substantially axial wall 32, and in that the air passage cavity 43 is in fluid communication with the air bleeding cavity 44 by means of apertures made in the substantially radial wall 63.

Due to the air passage cavity 43, which allows setting the air bleeding cavity 44 and the air mixing cavity 41 in fluid communication, the air 401 which is extracted downstream of the last high-pressure compressor 4 disk does not reach to the air intake cavity 42.

In fact, during operation, the air bleeding cavity 44 is at reduced pressure relative to the air intake cavity 42. This reduced pressure is provided by the position of the bleeding path 96 between the guide nozzle 601 and the first rotor disk 602 of the high-pressure turbine 6.

The fluid communication provided between the bleeding cavity 44 and the air mixing cavity 41 via the air passage cavity 43 ensures the passage of the air 401 having a low speed directly from the air mixing cavity 41 to the air bleeding cavity 44, along the path 95.

The section of FIG. 3 does not allow this to be seen precisely, but the air intake orifice does not prevent the circulation of air in the air mixing cavity 41 inasmuch as it only crosses the latter. The three-dimensional position of the air intake orifice will be more easily understood in connection with FIGS. 4 and 5 and it will then be better understood how the path 95 exists.

Only the air taken in by the air extraction orifice into the air intake cavity 42, which has a high tangential speed, can be taken into the cooling circuit 92.

In fact, the existing reduced pressure is sufficient to circulate the air in the air intake cavity 42 toward the air mixing cavity 41, along the path 94, and not the reverse as was the case in the cooling circuits of the prior art, as shown in FIG. 2.

Likewise, the upstream 51 and downstream 52 sealing gaskets provide sufficient sealing to the air intake cavity 42 so that the latter remains in overpressure relative to the air mixing 41, air passage 43 and air bleeding 44 cavities.

In the embodiment shown in FIG. 3, the upstream 51 and downstream 52 sealing gaskets are labyrinth seals formed by an assembly of rubbing strips 51*a*, 52*a* arranged facing an abradable material 51*b*, 52*b* for example in the form of honeycombs.

For example, the casing can be manufactured by additive manufacture.

In one embodiment, the abradable 51*b*, 52*b* can be a lamination of several metal sheets, the assembly then being applied to the casing.

In one embodiment, the apertures 62 made in the substantially axial wall 32 allow a greater flow rate of air than the apertures 63 provided in the substantially radial wall 33.

In other words, it is the apertures 63 made in the substantially radial wall 33 that limit the flow of air passing through the air passage cavity 43.

The comparison of FIG. 2 and of FIG. 3 further illustrates an additional advantage of the invention, which is the absence of the shroud serving to bound the air intake orifice, which ensures a reduced weight of the air intake casing.

In FIG. 3, the sealing gasket 53, crossed by the air flow 401 originating from the last stage of the high-pressure compressor 4 (also called the CDP seal for "compressor discharge pressure") is a so-called self-adjusting sealing gasket, comprising two portions 53*a* and 53*b*.

A gasket of this type is distinguished from rubbing seal gaskets in that it has an operating mode in which the clearance of the gasket is adjusted by the dynamic behavior of said gasket.

The use of such gaskets also allows reducing the quantity of air extracted upstream 401, which reduced the bleeding flow rate 96 and therefor increased the general efficiency of the turbine.

This embodiment is advantageous because the clearance that such gaskets allow is more reduced than that of rubbing strip gaskets, which reduce the air flow rate originating in the air mixing chamber and facilitate its depressurization.

In other embodiments, the sealing gaskets 52 and/or 53 can also be dynamic seal gaskets of this type, or in other words having self-adjusting sealing.

In the embodiment shown, the injector wall 31 is not strictly radial, but is indeed substantially radial within the meaning of the invention.

In one embodiment, which is shown, the substantially axial 32 and substantially radial 33 walls are strictly axial and radial, i.e. they are strictly straight.

In other embodiments, they can have a different shape from a straight shape, provided that they remain substantially axial and radial.

The particular shape of the injector wall 31 does not limit the invention, provided that this wall 31 prohibits the passage of the air in the axial direction between the air mixing 41 and air intake 42 cavities, which it defines.

In the embodiment shown, the injector wall 31 extends from upstream to downstream, then from downstream to upstream when it is traversed from its internal end to its external end, but this is not necessary.

FIGS. 4 and 5 show an air intake casing in one embodiment of the invention, in two distinct views.

In the embodiment shown, the first sealing gasket 51 is a labyrinth seal, the cartridge of abradable material 51*b* of which is attached to the internal end of the injector wall 31.

In the embodiment shown, the second sealing gasket 52 is a labyrinth seal, the cartridge of abradable material 52*b* of which is attached to the substantially axial wall 32 on the side of the air intake cavity 42.

FIG. 5 also allows showing the inclination $\alpha$ of the orientation of the apertures 62 passing through the substantially axial wall 32.

The inclination $\alpha$ is measured relative to the axis A of the turbomachine and can be comprised between 45° and 70°.

In the embodiment shown, the apertures 62 passing through the second wall 32 are located at the junction of the substantially axial wall 32 with the main wall 30.

This embodiment allows ensuring an excellent traverse of the air from the air mixing cavity 41 to the air bleeding cavity 44 via the air passage cavity 43.

In one embodiment which is not the one shown, the apertures 63 passing through the substantially radial wall 33 can also be inclined relative to the axis A of the turbomachine.

For example, the apertures 63 can have an inclination to the axial direction comprised between 45° and 85°, preferably between 70° and 83°.

Preferably, the inclination is in the direction of the tangential component of the incident air, i.e. in the direction of rotation of the rotor.

In FIG. 6, one embodiment of an air injection casing, already visible in FIG. 3, is shown in more detail.

Seen there is the air injection casing, as well as the path of the cooling air shown by the arrows 401, 92, 93, 94, 96.

In the embodiment shown, the casing upstream end 30*a* comprises an attachment flange 330*a*, the element to which it is linked not being shown here. The latter can however be integral with a wall of the combustion chamber, as was moreover visible in the larger view in FIG. 3.

In the embodiment shown, the casing downstream end 30*b* comprises an attachment flange 330*b*. The latter can be attached to a root 601*a* of the guide nozzle 601.

In the representation of FIG. 6, it is seen again that the portions 51*a* and 52*a* of the sealing gaskets 51 and 52, useful for the separation between the air intake cavities 42 and respectively the air mixing cavity 41 and the air bleeding cavity 44, are carried by the rotor 600 of a high-pressure turbine.

Likewise, FIG. 6 illustrates, if that was necessary, that a shroud 35 can axially bound the air mixing cavity and lead the air 401 from the extraction after the last movable high-pressure compressor disk to the mixing cavity 42.

In one embodiment an element of the rotor, for example a shroud 35, radially bounds closest to the axis A the air mixing cavity.

FIG. 6 illustrates in dotted lines that the air path 95 from the air mixing cavity 41 to the air bleeding cavity 44 via the air mixing cavity 43 is not blocked by the air intake orifice. In fact, although the representation of the orifice in two dimensions in FIG. 3 or 6 leads to the belief that communication is not possible, the representation in three dimensions in FIGS. 4 and 5 show that indeed the air 95 can circulate around the orifice.

Further, the representation of FIG. 9 shows only one orifice, but it is preferable that the injector comprise a plurality of them, angularly distributed around the main axis of the casing.

Also seen in FIG. 6 is that the air intake cavity 42 is in fluid communication with a cooling cavity 48, via an opening made in the rotor disk 600 carrying the movable blade 602 of the high-pressure turbine.

This cavity 48 in fluid communication with the air intake cavity 42 ensures that the cooling air penetrates into this cavity 48, and originating with the air 93 extracted below the combustion chamber by means of the air intake orifice, ensures that the air used for cooling hot parts 92 has a high tangential speed, which ensures better cooling of the parts.

The invention claimed is:

1. A cooling-air injection casing having an annular shape around a longitudinal axis defining an axial direction and comprising a casing upstream end, a casing downstream end and a casing main wall which connects the upstream casing end with the downstream casing end, the casing main wall having an annular shape with a diameter that increases from upstream to downstream, the casing further comprising:

an air mixing cavity, bounded axially by the casing main wall from its upstream end and radially by an injector wall integral with the casing main wall and which extends toward the longitudinal axis, the injector wall being connected to a substantially axial wall-which radially bounds the air mixing cavity;

an air intake cavity, bounded upstream by the injector wall and downstream by a high-pressure rotor disk, the air intake cavity being in fluid communication with the air upstream of the casing main wall via an air injector which has at least one air injector inlet made in the casing main wall and an air injector outlet made in the injector wall;

an air bleeding cavity bounded by a high-pressure rotor disk and a substantially radial wall connected to the casing main wall, the substantially radial wall being further connected to the substantially radial wall;

a first sealing gasket separating the air mixing cavity and the air intake cavity;

a second sealing gasket separating the air intake cavity and the air bleeding cavity;

the injection casing further having an air passage cavity bounded by the substantially radial wall, the casing main wall and the substantially axial wall, the air passage cavity being in fluid communication with the air mixing cavity via apertures made in the substantially axial wall, and in that the air passage cavity is in fluid communication with the air bleeding cavity by means of apertures made in the substantially radial wall and wherein the apertures made in the substantially axial wall-have an inclination-to the axial direction comprised between 45° and 70°.

2. The cooling-air injection casing according to claim 1, wherein the apertures made in the substantially axial wall are located at the junction of the substantially axial wall with the main wall.

3. The cooling-air injection casing according to claim 1, wherein the apertures made in the substantially radial wall have an inclination to the axial direction comprised between 45° and 85°.

4. The cooling-air injection casing according to claim 1, wherein the apertures made in the substantially radial wall have a diameter comprised between 1 mm and 5 mm.

5. The cooling-air injection casing according to claim 1, wherein the apertures made in the substantially radial wall-are placed in a radially external portion of the substantially radial wall.

6. The cooling-air injection casing according to claim 1, wherein the first sealing gasket is a sealing gasket that comprises a sealing element mounted on the radially internal end of the injector wall.

7. The cooling-air injection casing according to claim 1, wherein the second sealing gasket is a sealing gasket which comprises a sealing element mounted on the substantially axial wall on the side of the air intake cavity.

8. An aeronautical turbomachine comprising a rotor and a cooling-air injection casing according to claim 1 which extends around the rotor, the rotor comprising a high-pressure rotor disk-which bounds the air intake cavity and the air bleeding cavity, the cooling-air injection casing being located upstream of the high-pressure turbine rotor.

9. The aeronautical turbomachine according to claim 8, wherein the high-pressure turbine is a single-stage or two-stage high-pressure turbine.

* * * * *